Nov. 24, 1964  R. P. GEHMAN  3,157,979
HAY RAKE

Filed May 15, 1963  2 Sheets-Sheet 1

INVENTOR.
ROLAND P. GEHMAN
BY *Walter V. Wright*

AGENT

Nov. 24, 1964  R. P. GEHMAN  3,157,979
HAY RAKE
Filed May 15, 1963  2 Sheets-Sheet 2
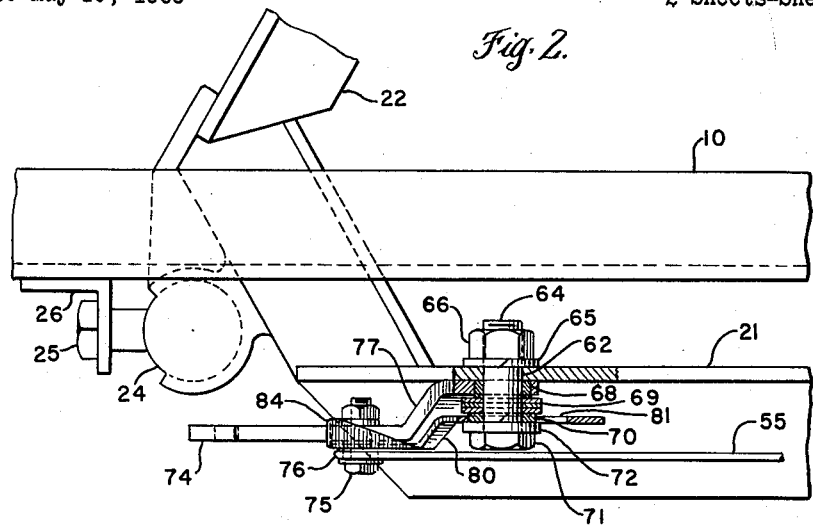
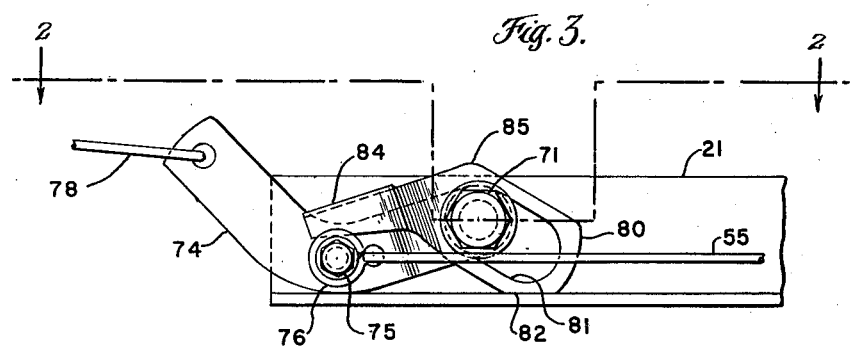
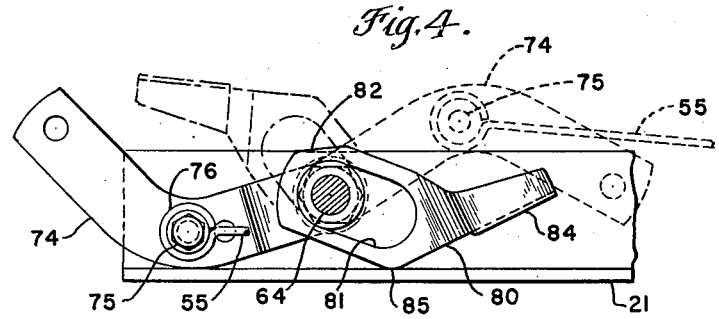
INVENTOR.
ROLAND P. GEHMAN
BY *Walter V. Wright*
AGENT 3,157,979
HAY RAKE
Roland P. Gehman, Akron, Pa., assignor to Sperry Rand Corporation, New Holland, Pa., a corporation of Delaware
Filed May 15, 1963, Ser. No. 280,518
2 Claims. (Cl. 56—377)

This invention relates generally to side delivery hay rakes. More specifically, this invention relates to side delivery hay rakes of the type having a rotatable raking reel journaled on a ground wheel supported frame.

On rakes of this type, one method commonly employed to drive the raking reel is to extend a drive train from the ground engaging support wheels of the frame to the raking reel. When the frame is towed over the ground, the support wheels rotate by virtue of their contact with the ground. This rotation of the ground wheels is transmitted through the drive train to rotate the raking reel. A clutch is provided to enable the operator to selectively engage or disengage the driving power to the raking reel. The clutch is normally spring biased into driving engagement, but may be thrown, and held, out of engagement by operation of an "over center" type control lever disposed at the front of the rake. This enables the operator to transport the implement between raking operations with the reel at rest. Upon arrival at the desired field, the operator stops the forward motion of the implement and engages the clutch. Thereafter, upon movement of the implement through the field, the raking reel is rotated to form cut crop material lying at random on the ground into windrows. The clutch is engaged with the implement at rest and the reel is gradually brought up to raking speed by the forward acceleration of the implement as it moves away from its at rest position.

Between raking operations these implements are commonly transported over the highways at speeds in the neighborhood of twenty miles per hour. If, during the transport of the rake, the overcenter clutch control lever is vibrated, or jarred, past its dead center position, the spring biased clutch flies into engagement. Due to the mass and inertia of the reel, engagement of the drive when the ground wheels are turning over at road transport speed will damage the drive train.

It is the general object of this invention to provide safety means to prevent such an occurrence.

It is another object of this invention to provide this safety means at negligible additional cost to the implement.

It is another object of this invention to provide safety means to prevent accidental engagement of the reel drive during road transport, which means will not hinder or interfere with the ease and convenience of operation of the existing clutch control lever.

It is another object of this invention to provide safety means to prevent accidental engagement of the reel drive during road transport which is easily and quickly engaged and which is dependable in operation.

It is another object of this invention to provide safety means as mentioned above which may be added to existing rakes and which requires no modification of the existing rake structure.

These and other objects and advantages of this invention will be apparent upon reference to the following description and claims taken in conjunction with the accompanying drawings wherein:

FIG. 2 is an enlarged fragmentary plan view taken on the line 2—2 of FIG. 3;

FIG. 3 is an enlarged fragmentary side elevational view of the clutch control mechanism taken on the line 3—3 of FIG. 1; and FIG. 4 is a fragmentary side elevational view similar to FIG. 3 showing the latch member in another position.

Figure 1:
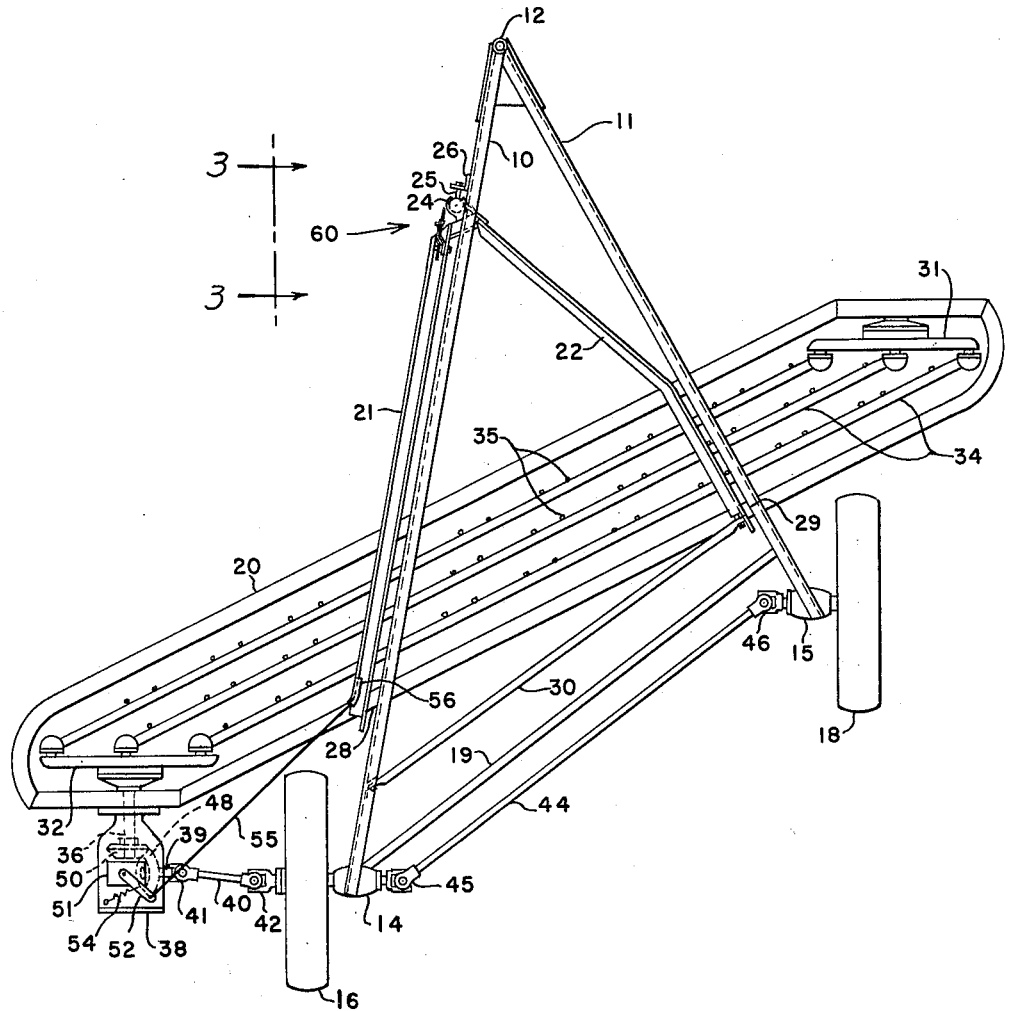
FIG. 1 is a plan view of a hay rake having raking reel drive mechanism constructed in accordance with the principles of this invention.

Referring to the drawings in detail, particularly to FIG. 1, the numerals 10 and 11 denote, respectively, left and right frame members of the rake main frame. The forward ends of these members are joined together and serve to mount a conventional hitch member 12 by which the rake may be connected to a towing vehicle. Members 10 and 11 diverge rearwardly and carry ground wheel journals 14 and 15, respectively, at their rearmost ends. Ground wheels 16 and 18 are journaled, respectively, in wheel journals 14 and 15. A transverse cross frame member 19 extends between members 10 and 11 adjacent the rear ends of these members. From the side, members 10 and 11 are low at the front ends and rear ends and arched high in the middle to provide ground clearance thereunder for a generally transversely disposed rake basket 20.

Rake basket 20 is a part of a sub frame structure which includes fore-and-aft extending frame members 21 and 22. The sub frame members 21 and 22 converge at their forward ends and carry a ball type socket 24 from which a threaded clamping member 25 projects forwardly. Clamping member 25 extends through a generally vertical slotted bracket 26 which is rigidly mounted on main frame member 10. The rear ends of sub frame members 21 and 22 are pivotally connected, respectively, to main frame members 10 and 11 at 28 and 29. The rake basket 20 is adjusted relative to the ground about the pivots at 28 and 29 by loosening clamping member 25 and raising or lowering it in slotted bracket 26. A transversely extending brace 30 reaches from main frame member 10 across the rear of the implement and connects to the rear of sub frame member 22 to stabilize the rake bracket against side sway relative to the main frame.

A first spider 31 is journaled for rotation about a generally horizontal fore-and-aft extending axis at the right front end of rake basket 20 while a second spider 32 is journaled for rotation about a generally horizontal fore-and-aft extending axis at the left rear end of rake basket 20. A plurality of rake bars 34 carrying tines 35 extend between the spiders and have their ends journaled on the spiders. The spiders and bars constitute a raking reel. As is well known in the art, when the spiders are rotated, the bars 34 and their tines 35 move downwardly at the rear of basket 20, sweep laterally across the ground and move upwardly at the front of the basket to rake crop material lying on the ground into a windrow at the left end of the basket 20.

The raking reel receives its driving power at spider 32. The shaft 36, to which spider 32 is keyed, extends rearwardly behind rake basket 20 and constitutes the output shaft of a gearbox 38. The input shaft 39 to gearbox 38 projects from the inboard side of the gearbox and has an extension shaft 40 connected to its projecting end and to the stub shaft of ground wheel 16 by universal joints 41 and 42, respectively. Ground wheels 16 and 18 are interconnected by a shaft 44 extending across the rear of the implement and connected to the ground wheel stub shafts by universal joints 45 and 46. With this arrangement, the driving power of both ground wheels is transmitted to the gearbox input shaft 39, and ultimately to the raking reel.

Inside gearbox 38 is a pair of meshing bevel gears 48 and 50 carried, respectively, by input shaft 39 and output shaft 36. A clutch 51 serves to selectively lock and unlock bevel gear 48 to input shaft 39. In this manner the drive train from ground wheels 16 and 18 to spider 32 may be selectively engaged or disengaged. Clutch 51 has an actuating member 52 projecting outside gearbox 38. Clutch actuating member 52 is biased rearwardly by a spring 54 into the engaged position, the position wherein gear 48 is drivingly locked to input shaft 39. A flexible cable 55 has its rear end connected to clutch actuating member 52. The cable 55 extends generally forwardly from member 52 through suitable guides, such as sleeve 56 mounted on sub frame member 21, to clutch control means, indicated generally by the reference numeral 60, at the front of the implement.

The clutch control means 60 is more clearly seen in enlarged FIGURES 2, 3 and 4. In these figures, it is clearly discernable that sub frame member 21 has an L-shaped cross section. A hole 62 extends transversely through the vertical flange of member 21 near its front end. A pivot member in the form of a bolt 64 extends through hole 62 and carries a lock washer 65 and nut 66 on the inboard side of member 21. Just outside of the vertical flange of member 21, bolt 64 carries a first bushing 68 (FIG. 2). Abutting the outboard end of bushing 68 is a series of spacer washers collectively indicated by the numeral 69. A second bushing 70 abuts the outermost of the washers 69. Between the outer end of bushing 70 and the head 71 of bolt 64 is a washer 72.

The first bushing 68 extends through an aperture in one end of an elongated lever 74. Lever 74 is formed from stock material of slightly less thickness than the axial length of bushing 68, thus lever 74 is free to swing about bolt 64 on bushing 68 even though bolt 64 and nut 66 are drawn tight. The forward end of cable 55 is connected to lever 74 by a nut and bolt 75 which pass through an eye 76 in the front end of the cable 55. As best seen in FIG. 2, lever 74 is offset at 77 to enable cable 55 to clear the head 71 of bolt 64 when the lever is pivoted about the bolt. The two extreme positions of lever 74 may be seen in FIG. 4. The spring 54 at the clutch actuating member 52 keeps tension on cable 55 and biases the control lever 74 clockwise about pivot bolt 64 toward the position shown in phantom lines in FIG. 4. This is the position of the control lever when clutch 50 is engaged to drive the raking reel. When the operator wishes to disengage the clutch, he swings lever 74 forwardly to the solid line position in FIG. 4. In the first, or phantom line, position of lever 74, the bolt 75 connecting cable 55 to lever 74 lies above the lever pivot bolt 64. As lever 74 swings forwardly, the cable bolt 75 passes a dead center position, wherein it lies in the horizontal plane of pivot bolt 64, and moves downwardly to the over center position shown in solid lines in FIG. 4. Forward swinging movement is stopped by engagement of lever 74 with the horizontal flange of angle iron frame member 21. Cable 55 now extends in a horizontal plane below that of pivot bolt 64, thus the tension of clutch spring 54 resists return movement of lever 74 back up to the dead center position. The forward movement of cable bolt 75 and cable 55 has swung clutch actuating member 52 (FIG. 1) forwardly and disengaged clutch 51.

This manipulation of lever 74 is usually done by a rope 78 (FIG. 3) which extends forwardly from lever 74 to the operator of the tractor towing the rake. To engage clutch 51 again, the operator pulls upwardly on rope 78 to move cable bolt 75 up past dead center. The clutch actuating spring 54 completes the movement of lever 74 to the phantom line position and throws the clutch into driving engagement.

Costly damage to the raking reel drive mechanism is almost certain to occur if, during high speed road transport of the implement, the raking reel drive clutch is suddenly engaged. To positively prevent such an occurrence, a latch plate, or member 80 is provided. The latch member 80 has an elongated slot 81 whose width, or smallest dimension, just exceeds the diameter of second bushing 70 on pivot bolt 64. The latch 80 is carried by bushing 70 as may be seen in FIG. 2, and it is offset like lever 74 so that it lies parallel to the lever. The thickness of the latch member is slightly less than the axial thickness of bushing 70 whereby the latch is free to move even though nut-bolt 64-66 are drawn tight. As seen in FIG. 3, latch member 80 has a surface 82 at one end engageable with the horizontal flange of frame member 21 when pivot bolt 64 is disposed at the upper left end of slot 81. This prevents any clockwise pivotal movement of the latch about bolt 64. In this position, a flange 84 at the opposite end of latch plate 80 engages the upper edge of lever 74 and prevents upward movement of the lever. The center of gravity of latch plate 80 is forwardly of the upper left end of slot 81 in FIG. 3 so the latch rests naturally in the position shown. To disengage the latch, it must be manually moved along bolt 64 to the position shown in phantom lines in FIG. 4 to dispose bolt 64 at the opposite end of slot 81. This lifts surface 82 from the horizontal flange of frame member 21 whereupon the latch plate may be pivoted clockwise about bolt 64 to the solid line position of FIG. 4. In this position, surface 82 is upwardly out of engagement with frame member 21 and flange 84 is disposed rearwardly out of the normal path of movement of lever 74. A corner 85 (FIG. 4) of the latch 80 rests on the horizontal portion of frame member 21. The center of gravity of the latch member is now disposed rearwardly of the corner 85 resting on frame member 21 whereby the latch rests naturally in its disengaged position until it is moved manually into engagement.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A side delivery hay rake comprising a frame adapted to be towed behind a tractor, a ground engaging wheel mounted on said frame, a raking reel mounted on said frame, drive means connected to said reel and said wheel to drive the reel from said ground engaging wheel upon movement of the frame over the ground, said drive means including a clutch having an actuating member movable between a first position wherein said clutch effects driving engagement of said drive means and a second position wherein said clutch effects disengagement of said drive means, spring means biasing said actuating member to said first position, and control means to move said actuating member from its first position to its second position in opposition to the biasing force of said spring means and to lock said actuating member in said second position and prevent accidental driving engagement of said clutch during road transport of the rake, said control means comprising a lever, pivot means mounting said lever on said frame for pivotal movement between a first position and a second position, means operatively connecting said lever to said clutch actuating member to move the actuating member from its first position to its second position in opposition to said biasing spring means upon movement of said lever from its first position to its second position, a latch member having an elongated slot therein, said pivot means passing transversely through said slot and thereby mounting said latch member on said frame for sliding movement and pivotal movement relative to said pivot means, said latch member having a first portion and a second portion selectively movable, respectively, into engagement with said lever and said frame to lock said lever in its second position upon movement of said latch member to dispose said pivot means at one end of said slot, and said latch member being pivotal out of locking engagement with said lever and frame upon movement of said latch member to dispose said pivot means at the other end of said slot.

2. A side delivery hay rake comprising a frame having a front end and a rear end, a pair of ground engaging wheels mounted on said frame at the rear end of the frame, a hitch member carried by said frame at the front end of the frame thereby adapting said frame to be towed in a forward direction by a tractor, a raking reel journaled on said frame forwardly of said wheels and extending generally transverse to the direction of travel of said frame, a gearbox mounted on said frame adjacent one end of said reel and one of said ground engaging wheels, said gearbox having an input shaft connected to said one of said ground engaging wheels and an output shaft connected to said raking reel, a clutch in said gearbox selectively operable to effect driving engagement and disengagement of said input shaft with said output shaft to selectively drive said reel in response to rotation of said one of said ground engaging wheels, said clutch having an actuating member projecting outside of said gearbox and movable between a first position wherein said clutch is engaged and a second position wherein said clutch is disengaged, a spring connected to said actuating member and normally biasing the actuating member to said first position, a lever disposed at the front end of said frame, a flexible member having one end connected to said clutch actuating member and the other end connected to said lever, a pivot member mounting said lever on said frame for pivotal movement from a first position past a dead center position to an over center position, said flexible member moving said clutch actuating member from its first position to its second position, in opposition to the biasing force of said spring, upon movement of said lever from its first position to its over center position, said spring opposing return movement of said lever from said over center position back past said dead center position, a latch plate disposed along side said lever and having an elongated slot therein, said pivot member extending transversely through said slot and mounting said latch plate for sliding movement relative to said pivot member to selectively dispose said pivot member at either end of said slot, said latch plate having a surface at one end thereof engageable with said frame to prevent pivotal movement of the latch plate about said pivot member when said pivot member is disposed at one end of said slot, said latch plate having a flange at the other end thereof engageable with said lever, when said lever is in its over center position and said pivot member is at said one end of said slot, to positively lock said lever in said over center position and prevent accidental driving engagement of said clutch during road transport of the rake, said surface moving out of engagement with said frame when said latch plate is moved to dispose said pivot member at the other end of said slot whereupon said latch plate is free to pivot about said pivot member to move said flange out of locking engagement with said lever.

References Cited by the Examiner
UNITED STATES PATENTS

| 2,746,233 | 5/56 | McClellan et al. | 56—377 |
| 2,781,626 | 2/57 | Happe et al. | 56—377 |
| 2,929,192 | 3/60 | Hill | 56—377 |

T. GRAHAM CRAVER, *Primary Examiner*.

RUSSELL R. KINSEY, *Examiner*.